(12) United States Patent
Takahashi (10) Patent No.: US 9,007,400 B2
(45) Date of Patent: Apr. 14, 2015

(54) IMAGE PROCESSING DEVICE, IMAGE PROCESSING METHOD AND COMPUTER-READABLE MEDIUM

(71) Applicant: Casio Computer Co., Ltd., Tokyo (JP)

(72) Inventor: Nobuteru Takahashi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 127 days.

(21) Appl. No.: 13/789,527

(22) Filed: Mar. 7, 2013

(65) Prior Publication Data
US 2013/0235078 A1    Sep. 12, 2013

(30) Foreign Application Priority Data
Mar. 8, 2012  (JP) .................................. 2012-051219

(51) Int. Cl.
G09G 5/00 (2006.01)
G06T 11/60 (2006.01)
G06T 11/00 (2006.01)
G06T 7/00 (2006.01)

(52) U.S. Cl.
CPC ................ G06T 11/60 (2013.01); G06T 11/00 (2013.01); G06T 7/0044 (2013.01); G06T 2207/30204 (2013.01)

(58) Field of Classification Search
CPC .................... H04N 5/265; G06T 2207/30204; G06T 19/006
See application file for complete search history.

(56) References Cited

U.S. PATENT DOCUMENTS

2011/0242134 A1*  10/2011  Miller et al. .................. 345/633

FOREIGN PATENT DOCUMENTS

| JP | 07-057080 A | 3/1995 |
|---|---|---|
| JP | 2005-234757 A | 9/2005 |

OTHER PUBLICATIONS

"Koubachi Wi-Fi Plant Sensor". Mar. 5, 2012, Koubachi AG.*

* cited by examiner

Primary Examiner — Kee M Tung
Assistant Examiner — Haixia Du
(74) Attorney, Agent, or Firm — Holtz, Holtz, Goodman & Chick PC (57) ABSTRACT

An object of the present invention to enable easy display of a virtual object toward a direction desired by a user, when performing a superimposed display of the virtual object in a captured image containing an augmented reality marker. In the present invention, a CPU identifies the direction of an AR marker detected from within an actual image captured in an image sensor as an imaging direction, rotates the virtual object so that the front side of the virtual object is directed toward the imaging direction in a state where the front side of the virtual object is directed toward a reference direction (for example, front side direction) of the AR marker, and performs a superimposed display of the virtual object on the area of the AR marker.

10 Claims, 6 Drawing Sheets

BACK SIDE

FRONT SIDE
(DEFAULT DIRECTION)

FIG. 3B

FRONT SIDE
(DEFAULT DIRECTION)

BACK SIDE

FIG. 4A
VIRTUAL OBJECT
(FRONT SIDE)

IMAGING FROM FRONT
SIDE OF AR MARKER

FIG. 4B
VIRTUAL OBJECT
(BACK SIDE)

IMAGING FROM BACK
SIDE OF AR MARKER

FIG. 4C
VIRTUAL OBJECT
(FRONT SIDE)

IMAGING FROM BACK
SIDE OF AR MARKER

FIG. 6

VIRTUAL OBJECT
(FRONT SIDE)

BACK SIDE

LEFT SIDE  RIGHT SIDE

FRONT SIDE OF AR MARKER
(REFERENCE DIRECTION)

PRIOR ART

IMAGE PROCESSING DEVICE, IMAGE PROCESSING METHOD AND COMPUTER-READABLE MEDIUM

CROSS-REFERENCE TO RELATED APPLICATION

This application is based upon and claims the benefit of priority from the prior Japanese Patent Application No. 2012-051219, filed Mar. 8, 2012, the entire contents of which is incorporated herein by reference.

BACKGROUND OF THE INVENTION

1. Field of the Invention

The present invention relates to an image processing device, an image processing method and a computer-readable medium by which recognizes an augmented reality marker within a captured actual image and performs a superimposed display of a virtual object on the actual image.

2. Description of the Related Art

Mobile terminal devices, such as smartphones, are becoming increasingly multifunctional and generally have an image processing function referred to as Augmented Reality (AR), in addition to a camera function (imaging function). In this function, a three-dimensional virtual object (for example, a character image, etc.) is superimposed and displayed on a predetermined area within an image captured by the camera function. Specifically, when a photographic subject is captured by the imaging function in a state where an AR marker composed of printed material (a marker on which a white pattern is drawn within a square black frame) is arranged at or near the location of the photographic subject, the mobile terminal device recognizes the AR marker contained in the captured image by analyzing the captured image, and performs a superimposed display of a virtual object on an area of this AR marker. In this type of conventional technique where a superimposed display of a virtual object is performed on an area of an AR marker, the three-dimensional location and the direction of an AR marker are detected based on the size and the tilt of its pattern, and the display location and the display direction of a virtual object on a captured image are determined based thereon (refer to Japanese Patent Application Laid-open (Kokai) Publication No. 2005-234757).

Figure 6:
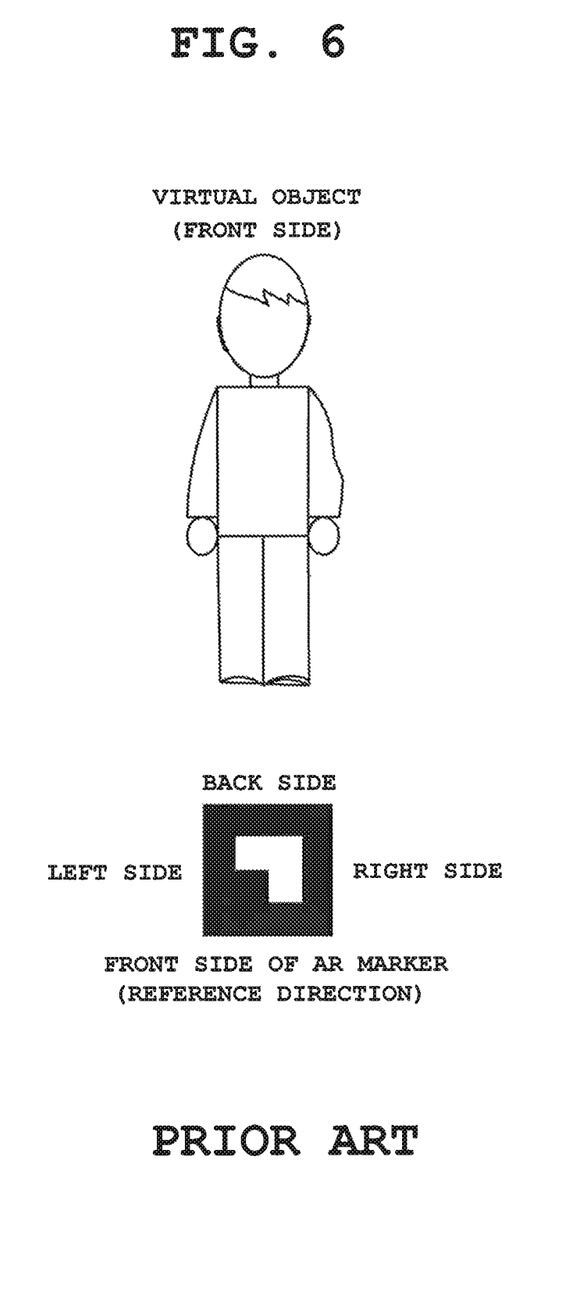
FIG. 6 is a diagram for describing the conventional technique, in which a virtual object (character) has been displayed so that its front side (face) is directed toward the same direction as the front side of an AR marker.

In the recognition of an AR marker within a captured image, a predetermined direction (such as the front side) of the AR marker is determined based on a white pattern within a black frame constituting the AR marker, and the display direction of a virtual object is determined to be the front side of the AR marker. FIG. 6 is a diagram showing an example where a virtual object (character) is displayed so that its front side (face) is directed toward the same direction as the front side of an AR marker. The AR marker of this example is patterned so that a white area having a random shape is arranged within a square black frame in which the black area and the white area have a predetermined proportion.

In this instance, a mobile terminal device analyzes a captured image (actual image), focuses on the black frame portion of an AR marker in the captured image, and thereby detects the area of the AR marker (the area of the black frame). Subsequently, the mobile terminal device then identifies the pattern of the white area drawn within the AR marker, and thereby recognizes the AR marker. Then, the mobile terminal device determines the front side of the AR marker based on the pattern shape of the white area, and performs a superimposed display of a three-dimensional virtual object on the area of the AR marker within the image so that the virtual object is directed toward the same direction as the front side of the AR marker.

However, since rotation control and a superimposed display is performed so that the front side of the three-dimensional object is directed toward the same direction as the front side of the AR marker, for example, if the location of the photographer deviates from the front side of the AR marker and captures an image from the back side of the AR marker, a backward virtual object is displayed. Also, if the photographer captures an image from one side of the AR marker, a sideways virtual object is displayed. As a result of this configuration, when imaging from the front side of an AR marker is troublesome, the user can only view a backward virtual object or a sideways virtual object.

An object of the present invention is to enable easy display of a virtual object toward a direction desired by a user, when performing a superimposed display of the virtual object in a captured image containing an augmented reality marker.

SUMMARY OF THE INVENTION

In accordance with one aspect of the present invention, there is provided an image processing device comprising: an imaging section equipped with an image sensor; a detecting section which detects an augmented reality marker from within an actual image captured in the image sensor; a recognizing section which recognizes the augmented reality marker detected by the detecting section; an imaging direction identifying section which identifies an imaging direction when the recognizing section recognizes the augmented reality marker; and a display control section which controls and performs a superimposed display of a virtual object so that the virtual object is directed toward a predetermined direction based on the imaging direction identified by the imaging direction identifying section with reference to a reference direction of the augmented reality marker.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to FIG. 1 to FIG. 5.

Figure 1:
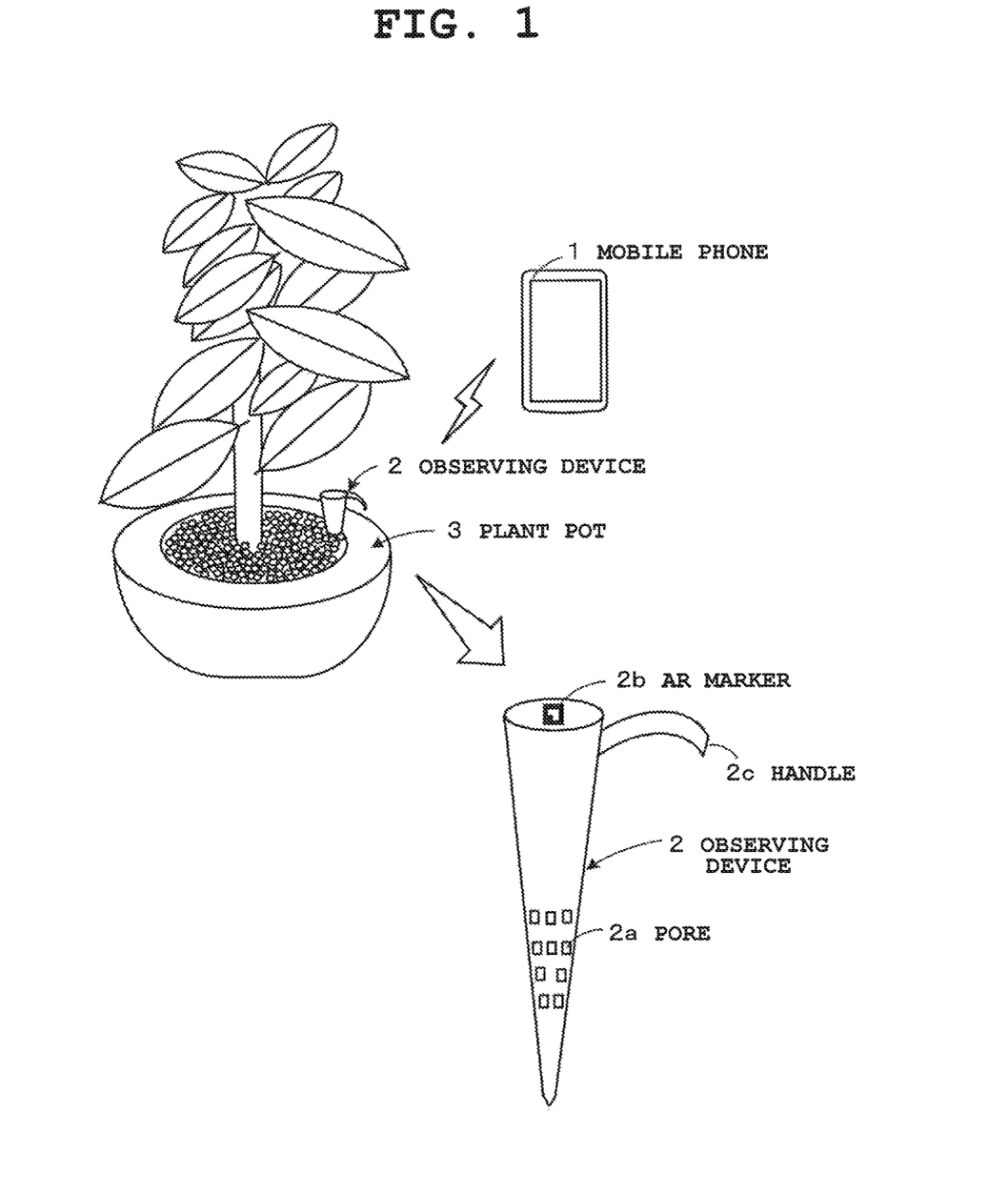
FIG. 1 is a diagram showing a multifunctional mobile phone 1 having a camera function and an observation device 2 that observes the growth environment of a plant.

The present embodiment is a multifunctional mobile phone (smartphone) having a camera function, in which the present invention has been applied as an image processing device. FIG. 1 is a diagram showing a multifunctional mobile phone 1 having a camera function and an observation device 2 that observes the growth environment of a plant.

The multifunctional mobile phone 1 has an augmented reality sense processing function for combining a predetermined virtual object (such as a character image) with an actual image captured by a camera function and displaying the combined image, and a short-range communication function for transmitting and receiving data to and from the observation device 2 by short-range communication, in addition to basic functions such as a call function, an electronic mail function, an Internet connection function, and the camera function.

The observation device 2 includes various sensors for detecting the growth environment (the moisture content of soil and surrounding temperature) of plants, such as potted plants or flowers, and has a short-range communication function for transmitting and receiving data to and from the multifunctional mobile phone 1 by short-range communication. The housing of the observation device 2 is in the shape of an elongated hollow stick as a whole. This stick-shaped body of the observation device 2 is formed into a tapered shape, and the lower portion thereof is buried in (inserted into) the soil of a plant pot 3. On the surface of the observation device 2 on the lower portion side, a plurality of pores 2$a$ for air ventilation and water conduction are formed. Also, on the top end surface of the observation device 2, an AR marker 2$b$ for displaying a virtual object is arranged by being printed. Note that the AR marker is not limited to that directly printed on the observation device 2, and a sticker printed with the AR marker may be attached to the top end surface of the observation device 2. On one side of the upper end portion of the observation device 2, an arc-shaped handle 2$b$ is formed (a one-piece mold) projecting outward.

Figure 2:
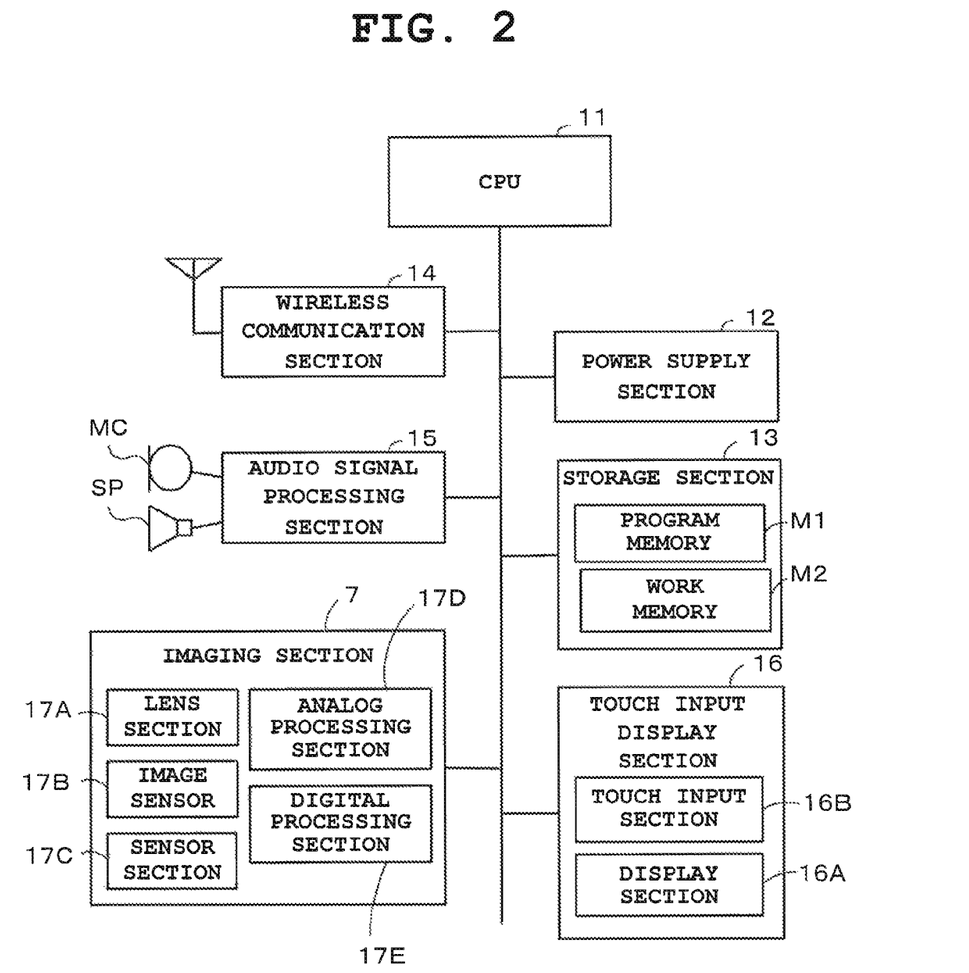
FIG. 2 is a block diagram showing basic components of the multifunctional mobile phone 1 having a camera function, in which the present invention has been applied as an image processing device.

FIG. 2 is a block diagram showing basic components of the multifunctional mobile phone 1 having a camera function.

A Central Processing Unit (CPU) 11 in FIG. 2 operates by receiving power from a power supply section 12 including a secondary battery (not shown), and controls the overall operation of the mobile phone 1 in accordance with various programs stored in a storage section 13. The storage section 13 includes a program memory M1 and a work memory M2. The program memory M1 stores programs for actualizing the present embodiment based on operation procedures shown in FIG. 5, various applications, and information required by these programs and applications. The work memory M2 is a work area that temporarily stores various information (for example, information about a captured image, a flag, a timer, etc.) required to operate the mobile phone 1. Note that the storage section 13 may be, for example, structured to include a detachable portable memory (recording media) such as a Secure Digital (SD) card or an Integrated Circuit (IC) card. Alternatively, the storage section 13 may be structured to be partially provided on a predetermined external server (not shown).

A wireless communication section 14 in FIG. 2 is a wide-range communication section used for the call function, the electronic mail function, and the Internet connection function. When the call function is running, the wireless communication section 14 outputs audio from a call speaker SP via an audio signal processing section 15. In addition, it loads audio data inputted from a call microphone MC from the audio signal processing section 15, and transmits and outputs this audio data from an antenna. A touch input display section 16 in FIG. 2 includes a display section 16A and a touch input section 16B, in which the touch input section 16B is arranged on the front surface of the high-definition display section 16A, whereby software keys (touch keys) are allocated and arranged in the touch input display section 16. This touch input display section 16 displays function names. Also, it senses a touch operation made by a finger or the like and inputs data based on the touch operation. The display section 16A is a high-definition liquid crystal display or the like, and serves as a viewfinder screen that displays a captured image as a live view image (monitor image) when the camera function is running.

An imaging section 17 in FIG. 2 constitutes a camera section capable of capturing a photographic subject in high definition, and includes a lens section 17A including a zoom lens and a focus lens (not shown), an image sensor 173 such as a Charge-Coupled Device (CCD) or a Complementary Metal-Oxide-Semiconductor (CMOS), a sensor section 17C including various sensors such as an illuminometer, an analog processing circuit 17D that performs color separation and gain adjustment for each RGB color component on image signals (analog value signals) photoelectrically converted by the image sensor 173 and converts them to digital value data, and a digital signal processing circuit 17E that performs color interpolation processing (demosaic processing) and the like on image data digitalized by the analog processing circuit 17D. In the present embodiment, the imaging mode is switchable to various types of modes, such a nightscape imaging mode, a sunset imaging mode, and an augmented reality sense imaging mode. In the augmented reality sense imaging mode, image capturing is performed using the augmented reality sense processing function. When the augmented reality sense processing function is running, the user captures an enlarged image including the top end surface (AR marker) of the observation device 2 using the imaging section 17.

Figure 3A:
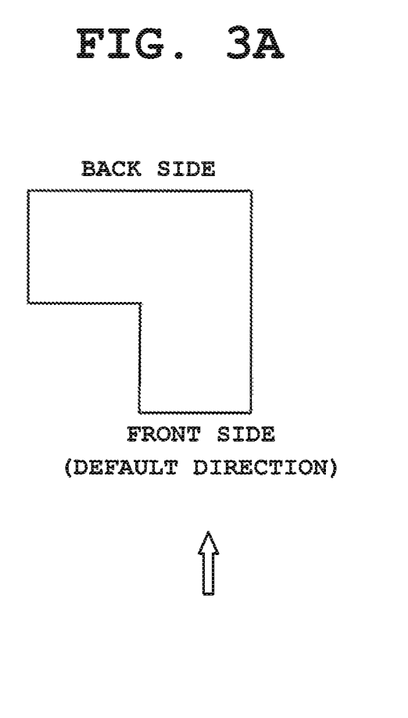
FIG. 3A and FIG. 3B are diagrams for describing the direction of an Augmented Reality (AR) marker and an eye direction toward the AR marker.
Figure 3B:
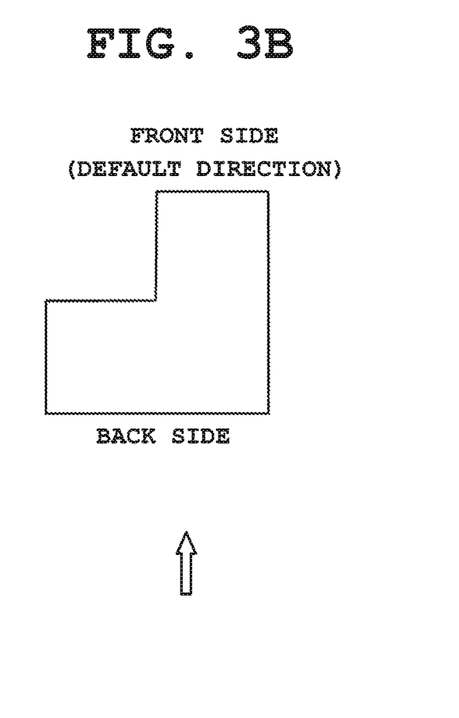

FIG. 3A and FIG. 3B are diagrams for describing the direction of an AR marker and the eye direction toward the AR marker.

The direction of each arrow in FIG. 3A and FIG. 3B indicates the user's eye direction (imaging direction) toward an AR marker. In FIG. 3A, the user is viewing an AR marker from its front side (a reference direction determined in advance: default direction). In FIG. 3B, the user is viewing an AR marker from its back side. In the present embodiment, after an AR marker is detected from within an actual image captured by the image sensor 17B, the location, the size, and the position of the AR marker are detected by the AR marker being recognized (position detecting section). The display location, the display size and the display direction (orientation) of a virtual object are specified corresponding to the detected location, size and position.

Then, a superimposed display of the virtual object is performed on the area of the AR marker within the actual image so that the front side of the virtual object is directed toward the same direction as the front side of the AR marker. In this instance, a three-dimensional virtual object is drawn within the two-dimensional actual image. Also, the above-described mode which displays a virtual object so that the front side of the virtual object is directed toward the same direction as the front side of the AR marker is referred to as a default direction display mode.

Figure 4A:
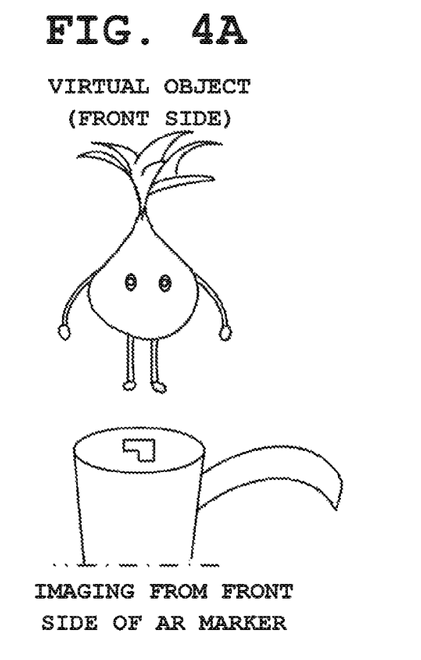
FIG. 4A to FIG. 4C are diagrams showing display examples of a virtual object (character image)
Figure 4B:
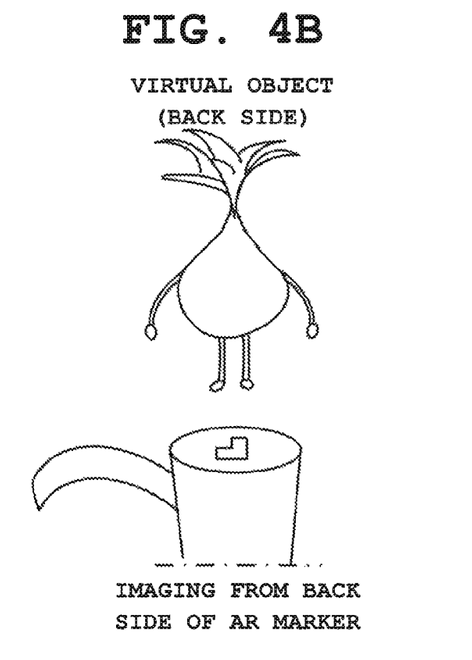

FIG. 4A shows a display example of a virtual object when an AR marker is viewed (when imaged) from the direction shown in FIG. 3A, or in other words, the front side thereof (default direction) in the default direction display mode. In FIG. 4A, a virtual object created by a plant (bulb) being anthropomorphized (a plant character) has been given as an example. Since a virtual object (character image) in the default direction display mode is displayed so that its face (front side) is directed toward the same direction as the front side of an AR marker, the face (front side) of the plant character has been directed toward the imaging direction. FIG. 4B is a display example of the virtual object when the AR marker is viewed (imaged) from the direction in FIG. 3B, or in other words, the back side thereof in the default direction display mode. Since a virtual object in the default direction display mode is displayed so that its face (front side) is directed toward the same direction as the front side of an AR marker, the back (back side) of the plant character is directed toward the imaging direction.

In the present embodiment, the above-described default direction display mode can be arbitrarily switched to an imaging direction display mode. In the imaging direction display mode, the locational direction (imaging direction) of the photographer is identified from the position of an AR marker (marker direction, etc.). The mode (viewpoint direction display mode) rotates and performs a superimposed display of the virtual object so that the front side of the virtual object is directed toward the imaging direction, based on a state where the front side of the virtual object is directed toward the front side of the AR marker (default direction). That is, in order to geometrically align an actual image and a virtual object, the location and the position of the user (photographer) are calculated from the location and the position of an AR marker within the actual image. Accordingly, the method of the alignment of an actual image and a virtual object differs between the default direction display mode and the imaging direction display mode.

As a result, in the imaging direction display mode, a rotation angle is calculated so that a virtual object is rotated and its front side is correctly directed toward the photographer, regardless of the direction of the front side of an AR marker (default direction) within an actual image captured in the image sensor 178. That is, an angle from the default direction (front side) of the AR marker to the imaging direction is calculated. Then, after being rotated by the calculated angle, a superimposed display of the virtual object is performed on the area of the AR marker within the actual image.

Figure 4C:
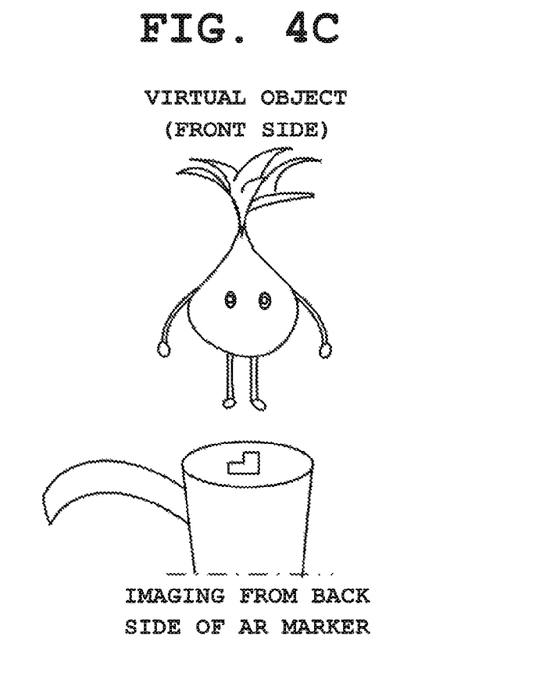

FIG. 4C is a display example of the virtual object when the current mode is switched to the imaging direction display mode and the AR marker is viewed (imaged) from the back side. As shown in FIG. 4C, even when the AR marker is imaged from the back side, the face (front side) of the virtual object is directed toward the imaging direction. Similarly, even when the AR marker is viewed (imaged) from the left or right side of the AR marker, the face (front side) of the virtual object is directed toward the imaging direction. When the imaging direction display mode is canceled and switched to the above-described default direction display mode, the virtual object returns to the display state where its face (front side) is directed toward the same direction as the front side of the AR marker.

Figure 5:
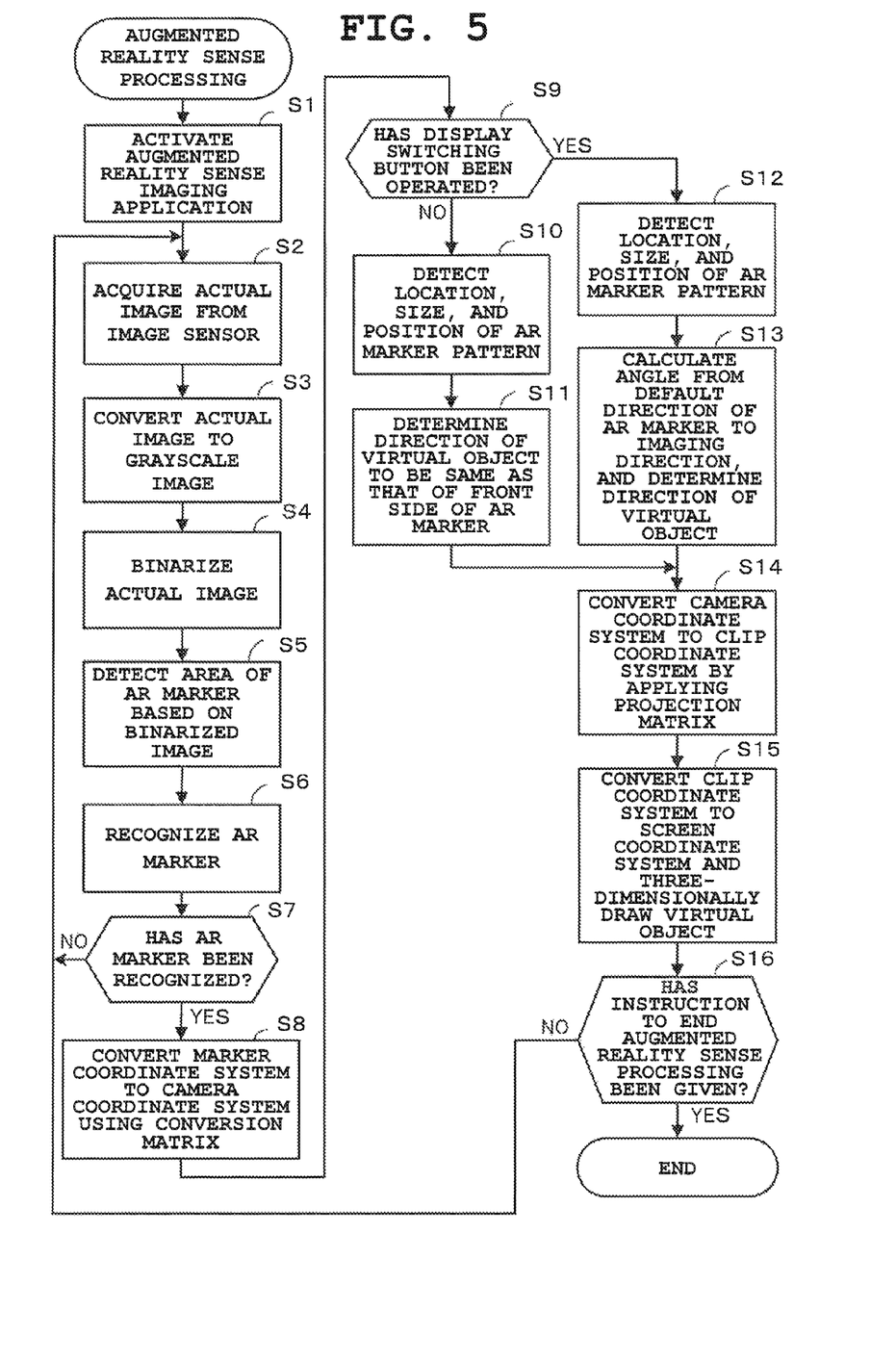
FIG. 5 is a flowchart for describing augmented reality sense processing that is started when the current mode is switched to an augmented reality sense imaging mode.

Next, the operational concept of the multifunctional mobile phone 1 according to the present embodiment will be described with reference to the flowchart shown in FIG. 5. Here, each function described in the flowchart is stored in a readable program code format, and operations based on these program codes are sequentially performed. Also, operations based on the above-described program codes transmitted over a transmission medium such as a network can also be sequentially performed. Note that FIG. 5 is a flowchart outlining operations of the characteristic portion of the first embodiment from among all of the operations of the multifunctional mobile phone. After exiting the flow in FIG. 5, the procedure returns to the main flow (not shown) of the overall operation of the multifunctional mobile phone.

FIG. 5 is a flowchart for describing the augmented reality sense processing that is started when the current mode is switched to the augmented reality sense imaging mode.

First, when the current mode is switched to the augmented reality sense imaging mode by a user operation or the like, the CPU 11 activates an augmented reality sense imaging application (augmented reality sense processing function) (Step S1), and acquires an image (actual image) captured in the image sensor 17B (Step S2). Subsequently, the CPU 11 converts the acquired actual image to a grayscale image based on the brightness (Step S3). Then, the CPU 11 performs binarization processing in accordance with the adaptive binarization method on this grayscale image (Step S4), and performs processing to detect the area of an AR marker based on the binarized image (Step S5) (detecting section). In this instance, the CPU 11 detects, for example, a square black frame as the area of an AR marker.

After detecting the area of an AR marker as described above, the CPU 11 performs processing to recognize the AR marker (Step S6) (recognizing section). In this instance, the CPU 11 identifies the pattern of a white area drawn within the AR marker, and after dividing the image thereof into a plurality of areas, converts these areas into data having values from 0 to 255 (pattern files). In addition, the CPU 11 performs template matching in which the pattern is compared with a registered pattern (default pattern), and then performs the recognition of the AR marker. When judged that the AR marker has not been recognized (NO at Step S7), the CPU 11 returns to above-described Step S2 and acquires an actual image of the next frame. Conversely, when judged that the AR marker has been successfully recognized (YES at Step S7), the CPU 11 performs processing to convert from a marker coordinate system to a camera coordinate system using a 4-by-4 matrix (conversion matrix) composed of rotational components and translational components (Step S8).

Then, the CPU 11 judges whether or not a display switching button (switching section) (not shown) has been operated (Step S9). The display switching button herein is a button that is used to switch the display mode (default direction display mode) where a virtual object is displayed so that its front side is directed toward the same direction as the front side of an AR marker (default direction) to the display mode (imaging direction display mode) where a virtual object is displayed so that its front side is directed toward the imaging direction. When judged that the display switching button has not been operated and the current mode remains set to the default direction display mode (NO at Step S9), the CPU 11 identifies the pattern of the white area drawn within the AR marker and detects the location, the size, and the position of the pattern portion (Step S10).

Next, the CPU 11 determines the direction of the virtual object to be the same as that of the front side of the AR marker (default direction) (Step S11). Subsequently, the CPU 11 proceeds to Step S14, and converts the above-described camera coordinate system to a clip coordinate system having a sense of depth by applying a projection matrix to the camera coordinate system. Then, the CPU 11 performs three-dimensional drawing processing which further converts the clip coordinate system to a screen coordinate system, and performs a superimposed display of the three-dimensional virtual object on the area of the AR marker in the actual image (Step S15). In this instance, the drawn virtual object is proportional to the size of the above-described pattern of the AR marker, and the front side of the virtual object is directed toward the same direction as the front side of the AR marker.

Here, when imaging is performed from the front side of the AR marker, the face (front side) of the virtual object is directed toward the imaging direction, as shown in FIG. 4A. However, when imaging is performed from the back side of the AR marker, the back side of the virtual object is directed toward the imaging direction, as shown in FIG. 4B. Then, the CPU 11 judges whether or not an instruction to end the augmented reality sense processing has been given by a user operation (Step S16). When judged that an instruction to end the augmented reality sense processing has been given (YES at Step S16), the CPU 11 exits the flow in FIG. 5. Conversely, when judged than an instruction to end the augmented reality sense processing has not been given (NO at Step S16), the CPU 11 returns to above-described Step S2.

At Step S9, when judged that the display switching button has been operated, or in other words, the current mode has been switched from the default direction display mode to the imaging direction display mode (YES at Step S9), the CPU 11 identifies the pattern of the white area drawn within the AR marker and detects the location, the size, and the position of the pattern portion (Step S12). In this instance, the position of the AR marker within the actual image captured in the image sensor 17B, which is based on the shape and tilt of the AR marker with respect to its front side (default direction), serves as the locational direction (imaging direction) of the photographer (imaging direction identifying section).

Then, the CPU 11 calculates a rotation angle from the default direction (front side) of the AR marker to the current direction of the AR marker (imaging direction), and determines the direction of the virtual object (Step S13) Subsequently, the CPU 11 converts the above-described camera coordinate system to a clip coordinate system having a sense of depth by applying a projection matrix to the camera coordinate system (Step S14) Moreover, the CPU 11 performs three-dimensional drawing processing which further converts the clip coordinate system to a screen coordinate system and performs a composite display in which a three-dimensional virtual object is superimposed on the area of the AR marker in the actual image (Step S15) (display control section). As described above, when imaging is performed from the back side of the AR marker in the imaging direction display mode, the face (front side) of the virtual object is directed toward the imaging direction as shown in FIG. 4C. Then, when judged that an instruction to end the augmented reality sense processing has been given (YES at Step S16), the CPU 11 exits the flow in FIG. 5. Conversely, when judged than an instruction to end the augmented reality sense processing has not been given (NO at Step S16), the CPU 11 returns to above-described Step S2.

As described above, the multifunctional mobile phone 1 of the present embodiment rotates and performs a superimposed display of a virtual object so that the front side of the virtual object is directed toward the imaging direction, based on a state where the front side of the virtual object is directed toward a reference direction (such as the front side) of an AR marker. Therefore, in the present embodiment, a virtual object can be easily displayed to face a direction desired by the user. As a result of this configuration, the user can view a virtual object directed toward a desired direction without changing the imaging location (viewpoint location).

In addition, in the present embodiment, as the default direction display mode can be switched to the imaging direction display mode, this enables switching from a state which performs a superimposed display so that the front side of a virtual object is directed toward the front side of an AR marker to a state which rotates and performs a superimposed display so that the front side of a virtual object is directed toward the imaging direction. Thus, in the default direction display mode and the imaging direction display mode, a display corresponding to a user's desire can be attained by changing the method of alignment between an actual image and a virtual object.

Moreover, in the present embodiment, a rotation angle from the default direction (front side) of an AR marker to the current direction (imaging direction) of the AR marker is calculated, and the direction of a virtual object is determined thereby. Then, the virtual object is rotated by the calculated angle and a superimposed displayed is performed. As a result of this configuration, the direction of a virtual object can be controlled with reference to the direction of an AR marker.

Furthermore, in the present embodiment, an AR marker is mounted on the observation device 2 that observes the growth environment of a plant in a plant pot. When an image of the AR marker mounted on the observation device 2 is captured, the AR marker is detected from within the actual image capture in the image sensor 17B. That is, the present invention is effective for observation devices for plants. Specifically, after the observation device 2 is inserted into the soil of a plant pot, if the observation device 2 is reinserted or rotated to change the direction of the AR marker, the state of contact between the observation device 2 and the soil changes, whereby the growth environment changes. Even in a case like this, the user can view a virtual object facing a desired direction without moving the observation device 2 (without changing the direction of the AR marker). In addition, even when the plant pot is placed by a window (even when the imaging direction is restricted), the user can view a virtual object facing a desired direction without changing the imaging location (viewpoint location).

In the above-described embodiment, a rotation angle from the default direction (front side) of an AR marker to the current direction of the AR marker (imaging direction) is calculated, and the direction of a virtual object is determined based thereon. However, instead of calculation of the rotation angle, an acceleration sensor (not shown) having an electronic compass may be used to detect the position of the housing (device main body) of the multifunctional mobile phone 1, and the direction of a virtual object may be determined based on the detected position of the device main body. In this configuration as well, the same processing can be actualized by a portion of the flow in FIG. 5 being changed, or in other words, "calculate rotation angle and determine direction of virtual object" at Step S13 in FIG. 5 being changed to "determine direction of a virtual object based on detection result (position of the device main body) from acceleration sensor having electronic compass". That is, in this configuration, the direction of a virtual object is changed by a registered default pattern being rotated based on a detection result (position of the device main body) from the acceleration sensor having an electronic compass.

In this configuration where the direction of a virtual object is determined based on a detection result (position of the device main body) from the acceleration sensor having an electronic compass, the direction of a virtual object can be changed simply by a registered default pattern file being three-dimensionally rotated based on a detection result (position of the device body) from the acceleration sensor having an electronic compass, without a captured image being converted into a pattern file. Therefore, the processing to convert a captured image into a pattern file is unnecessary, whereby noise does not occur, and the direction of a virtual object can be accurately changed.

Also, in the default direction display mode of the above-described embodiment, a virtual object is displayed so that its face (front side) is directed toward the same direction as the front side of an AR marker. However, the virtual object may be displayed so that its face (front side) is directed toward the same direction as the back side of the AR marker. That the default direction of the AR marker may be determined arbitrarily.

Moreover, in the imaging direction display mode of the above-described embodiment, a virtual object is displayed so that its face (front side) is directed toward the imaging direction. However, a configuration may be adopted in which the left or the right side, or the back side of a virtual object is directed toward the imaging direction. In addition, a configuration may be adopted in which a virtual object is directed toward a predetermined direction set based on angle or the like. Moreover, a configuration may be adopted in which the direction of a virtual object is designated by the user.

Furthermore, in the above-described embodiment, an AR marker is mounted on the top surface of the observation device 2 that observes the growth environment of a plant in a plant pot. However, the AR marker may be mounted on the base of the plant, on the outer side of the plant pot, or the like. Also, the AR is not limited to that related to plants.

Still further, in the above-described embodiment, a plant (bulb) character has been given as an example of a virtual object. However, the present invention is not limited thereto. In addition, a configuration may be adopted in which plural types of virtual objects are stored in association with types of AR markers, and a virtual object associated with an AR marker identified by AR marker recognition is displayed.

Yet still further, in the above-described embodiment, the present invention has been applied to a multifunctional mobile phone (smartphone) having a camera function. However, the present invention is not limited thereto and may be applied to, for example, a personal computer, a Personal Digital Assistant (PDA), a music player, or an electronic gaming device having a camera function, as well as a digital camera itself.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing device comprising:
   an imaging section equipped with an image sensor; and
   a processor which is operable as:
   a detecting section which detects an augmented reality marker from within an actual image captured in the image sensor;
   a recognizing section which recognizes the augmented reality marker detected by the detecting section;
   an imaging direction identifying section which identifies an imaging direction when the recognizing section recognizes the augmented reality marker, wherein the imaging direction identifying section identifies the imaging direction by calculating the imaging direction from a location, size, and position of the augmented reality marker from within the actual image, the imaging direction being a direction from the position of the augmented reality marker within the actual image toward the image sensor;
   a rotation angle calculating section which calculates an angle between the imaging direction and a reference direction of the augmented reality marker, wherein the calculated angle serves as a rotation angle; and
   a display control section which controls and performs a superimposed display of a virtual object on a display according to at least a first display mode and second display mode, wherein in the first display mode, the display control section controls and performs a superimposed display of the virtual object so that the virtual object is directed toward a predetermined direction based on the reference direction of the augmented reality marker, without reference to the calculated imaging direction and rotation angle, and in the second display mode, the display control section controls and performs a superimposed display of the virtual object so as to rotate the virtual object by the calculated rotation angle from the reference direction of the augmented reality marker so that a predetermined direction of the virtual object is directed toward the imaging direction.

2. The image processing device according to claim 1,
   wherein the processor is further operable as a switching section which switches a display mode between the first display mode and the second display mode,
   wherein when the switching section switches the display mode to be the first display mode, the display control section controls and performs a superimposed display of the virtual object so that a front side of the virtual object is directed toward a same direction as a front side of the augmented reality marker, and
   wherein when the switching section switches the display mode to be the second display mode, the display control section controls and performs a superimposed display of the virtual object so as to rotate the virtual object by the calculated rotation angle from the reference direction of the augmented reality marker so that the front side the virtual object is directed toward the imaging direction.

3. The image processing device according to claim 2, wherein the processor is further operable as a position detecting section which detects the location, size, and position of the augmented reality marker from within the actual image, and detects a position of the image sensor based on the detected location, size and position of the augmented reality marker,
   wherein the imaging direction identifying section calculates the imaging direction based on the detected position of the image sensor and the detected position of the augmented reality marker detected by the position detecting section, and
   wherein, in the second display mode, the display control section controls and performs a superimposed display of the virtual object so as to rotate the virtual object by the calculated rotation angle from the reference direction of the augmented reality marker so that a front side of the virtual object is directed toward the imaging direction.

4. The image processing device according to claim 2, wherein the predetermined direction is a direction set by a user.

5. The image processing device according to claim 2,
wherein the augmented reality marker is mounted on an observing device that observes growth environment of a plant in a plant pot; and
wherein the detecting section detects the augmented reality marker from within the actual image captured in the image sensor when the imaging section images the augmented reality marker mounted on the observing device.

6. The image processing device according to claim 1, wherein the processor is further operable as a position detecting section which detects the location, size, and position of the augmented reality marker from within the actual image, and detects a position of the image sensor based on the detected location, size and position of the augmented reality marker,
wherein the imaging direction identifying section calculates the imaging direction based on the detected position of the image sensor and the detected position of the augmented reality marker detected by the position detecting section, and
wherein, in the second display mode, the display control section controls and performs a superimposed display of the virtual object so as to rotate the virtual object by the calculated rotation angle from the reference direction of the augmented reality marker so that a front side of the virtual object is directed toward the imaging direction.

7. The image processing device according to claim 1, wherein the predetermined direction is a direction set by a user.

8. The image processing device according to claim 1, wherein the augmented reality marker is mounted on an observing device that observes growth environment of a plant in a plant pot; and
wherein the detecting section detects the augmented reality marker from within the actual image captured in the image sensor when the imaging section images the augmented reality marker mounted on the observing device.

9. An image processing method for an image processing device comprising an imaging section equipped with an image sensor, the method comprising:
detecting an augmented reality marker from within an actual image captured in the image sensor;
recognizing the detected augmented reality marker;
identifying step of identifying an imaging direction when the augmented reality marker is recognized, wherein identifying the imaging direction comprises calculating the imaging direction from a location, size, and position of the augmented reality marker from within the actual image, the imaging direction being a direction from the position of the augmented reality marker within the actual image toward the image sensor;
calculating an angle between the imaging direction and a reference direction of the augmented reality marker, wherein the calculated angle serves as a rotation angle; and
controlling and performing a superimposed display of a virtual object on a display according to at least a first display mode and second display mode, wherein in the first display mode, a superimposed display of the virtual object is controlled and performed so that the virtual object is directed toward a predetermined direction based on the reference direction of the augmented reality marker, without reference to the calculated imaging direction and rotation angle, and in the second display mode, a superimposed display of the virtual object is controlled and performed so as to rotate the virtual object by the calculated rotation angle from the reference direction of the augmented reality marker so that a predetermined direction of the virtual object is directed toward the imaging direction.

10. A non-transitory computer-readable storage medium having stored thereon a program that is executable by a computer, the program being executable by the computer to perform functions comprising:
detecting an augmented reality marker from within an actual image captured in an image sensor;
recognizing the detected augmented reality marker;
identifying an imaging direction when the augmented reality marker is recognized, wherein identifying the imaging direction comprises calculating the imaging direction from a location, size, and position of the augmented reality marker from within the actual image, the imaging direction being a direction from the position of the augmented reality marker within the actual image toward the image sensor;
calculating an angle between the imaging direction and a reference direction of the augmented reality marker, wherein the calculated angle serves as a rotation angle; and
controlling and performing a superimposed display of a virtual object on a display according to at least a first display mode and second display mode, wherein in the first display mode, a superimposed display of the virtual object is controlled and performed so that the virtual object is directed toward a predetermined direction based on the reference direction of the augmented reality marker, without reference to the calculated imaging direction and rotation angle, and in the second display mode, a superimposed display of the virtual object is controlled and performed so as to rotate the virtual object by the calculated rotation angle from the reference direction of the augmented reality marker so that a predetermined direction of the virtual object is directed toward the imaging direction.

\* \* \* \* \*

UNITED STATES PATENT AND TRADEMARK OFFICE
CERTIFICATE OF CORRECTION

PATENT NO. : 9,007,400 B2 Page 1 of 1
APPLICATION NO. : 13/789527
DATED : April 14, 2015
INVENTOR(S) : Nobuteru Takahashi

It is certified that error appears in the above-identified patent and that said Letters Patent is hereby corrected as shown below:

IN THE CLAIMS

Column 11, Claim 9, Line 46, delete "identifying step of".

Signed and Sealed this
Sixth Day of October, 2015

Michelle K. Lee
*Director of the United States Patent and Trademark Office*